United States Patent
Fujii et al.

(10) Patent No.: US 7,676,296 B2
(45) Date of Patent: Mar. 9, 2010

(54) SUBSTRATE PROCESSING SYSTEM, SUBSTRATE PROCESSING METHOD AND COMPUTER-READABLE STORAGE MEDIUM STORING VERIFICATION PROGRAM

(75) Inventors: Katsuhisa Fujii, Koshi (JP); Masato Nomura, Koshi (JP); Shuji Ohno, Koshi (JP); Toshifumi Sohara, Koshi (JP)

(73) Assignee: Tokyo Electron Limited, Tokyo-To (JP)

( * ) Notice: Subject to any disclaimer, the term of this patent is extended or adjusted under 35 U.S.C. 154(b) by 186 days.

(21) Appl. No.: 11/517,279

(22) Filed: Sep. 8, 2006

(65) Prior Publication Data

US 2007/0141730 A1 Jun. 21, 2007

(30) Foreign Application Priority Data

Sep. 9, 2005 (JP) ............................. 2005-262563

(51) Int. Cl.
*G06F 19/00* (2006.01)
(52) U.S. Cl. ........................ 700/121; 700/108; 700/109; 700/110
(58) Field of Classification Search ......... 700/108–110, 700/121
See application file for complete search history.

(56) References Cited

U.S. PATENT DOCUMENTS

| 6,415,193 | B1 * | 7/2002 | Betawar et al. | ............... 700/97 |
| 2006/0175305 | A1 * | 8/2006 | Mitrovic | ................. 219/121.54 |
| 2006/0178768 | A1 * | 8/2006 | Chung et al. | ................. 700/121 |

FOREIGN PATENT DOCUMENTS

JP 2001-345241 12/2001

* cited by examiner

*Primary Examiner*—Kidest Bahta
*Assistant Examiner*—Nathan Laughlin
(74) *Attorney, Agent, or Firm*—Oblon, Spivak, McClelland, Maier & Neustadt, L.L.P.

(57) ABSTRACT

Disclosed is a method of verifying a recipe execution program. When a computer executes a recipe execution program, the computer sends instructions, which are issued based on a process recipe data defining specific operations to be performed by a substrate processing apparatus, to the substrate processing apparatus. When a computer executes a log output program, the computer outputs a log data indicating the instructions sent to the substrate processing apparatus. When a computer executes a comparing and checking program, the computer compares the log data which the process recipe data corresponding to the log data.

4 Claims, 10 Drawing Sheets

| PROCESS STEP | TIME (sec) | SPINNER | | DISPENSE | ARM 1 | | ... | CHECK RESULT |
|---|---|---|---|---|---|---|---|---|
| | | ROTATION SPEED (rpm) | ACCELERATION (rpm/s) | | POSITION | SPEED (mm/s) | | |
| 1 | T1 | X1 | Y1 | | Begin(Wait) | Z1 | | OK |
| 2 | T2 | X2 | Y2 | | Begin | Z2 | | OK |
| 3 | T3 | X3 | Y3 | | Begin | Z3 | | OK |
| 4 | T4 | X4 | Y4 | 1 | Center | Z4 | | OK |
| 5 | T5 | X5 | Y5 | | Center | Z5 | | NG |
| — | — | — | — | — | — | — | | — |
| — | — | — | — | — | — | — | | — |
| — | — | — | — | — | — | — | | — |

SUBSTRATE PROCESSING SYSTEM, SUBSTRATE PROCESSING METHOD AND COMPUTER-READABLE STORAGE MEDIUM STORING VERIFICATION PROGRAM

FIELD OF THE INVENTION

The present invention relates to a substrate processing system and a substrate processing method that perform a series of processes to a substrate, and a computer-readable storage medium storing a verification program.

BACKGROUND ART

When a photolithography is performed in manufacturing a semiconductor device, a series of processes are sequentially carried out to form a predetermined resist pattern on a semiconductor wafer as a substrate to be processed. That is, there are performed, for example: a resist coating process for applying a resist liquid on the wafer to form thereon a resist film; an exposure process for exposing the resist film with a predetermined pattern; a heating process (post-exposure baking) for accelerating a chemical reaction in the resist film after exposure; and a developing process for developing the exposed resist film.

Figure 9:
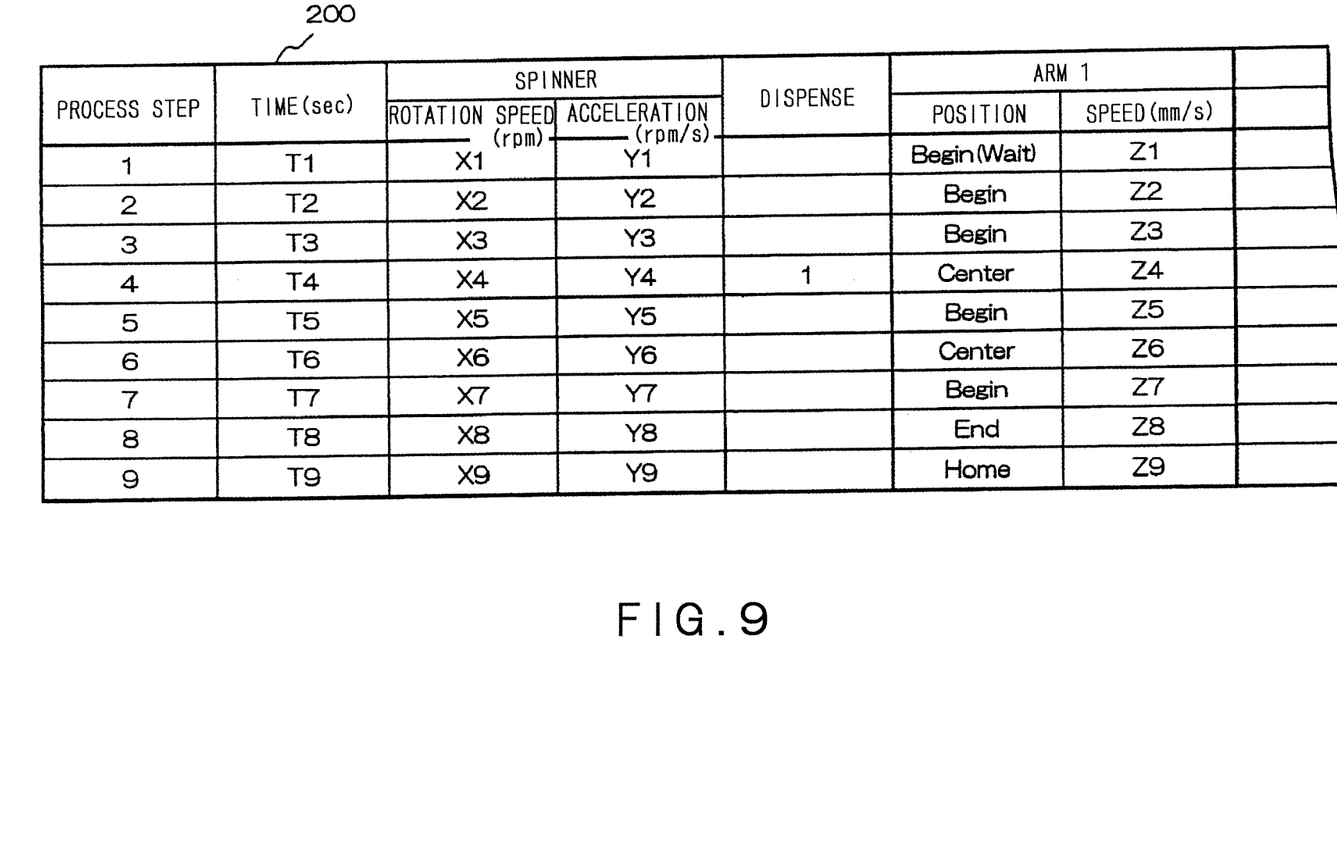
FIG. 9 is an example of a process recipe.

Process recipes respectively corresponding to the above series of processes are previously determined for every process lot of the wafer. The process recipe is data that define, in detail, conditions of a process to be performed to the wafer in each process. FIG. 9 shows an example of the process recipe. FIG. 9 is an example used in an apparatus for performing a resist coating process to a wafer by a spin-coating method by means of a spinner (substrate rotating unit). As shown in the process recipe 200, it defines a process period; a rotational speed and an acceleration of the spinner; a dispense specification for specifying distribution of a process liquid; and a position and an operational speed of an (robot) arm, for each of the process steps constituting the resist coating process.

Figure 10:
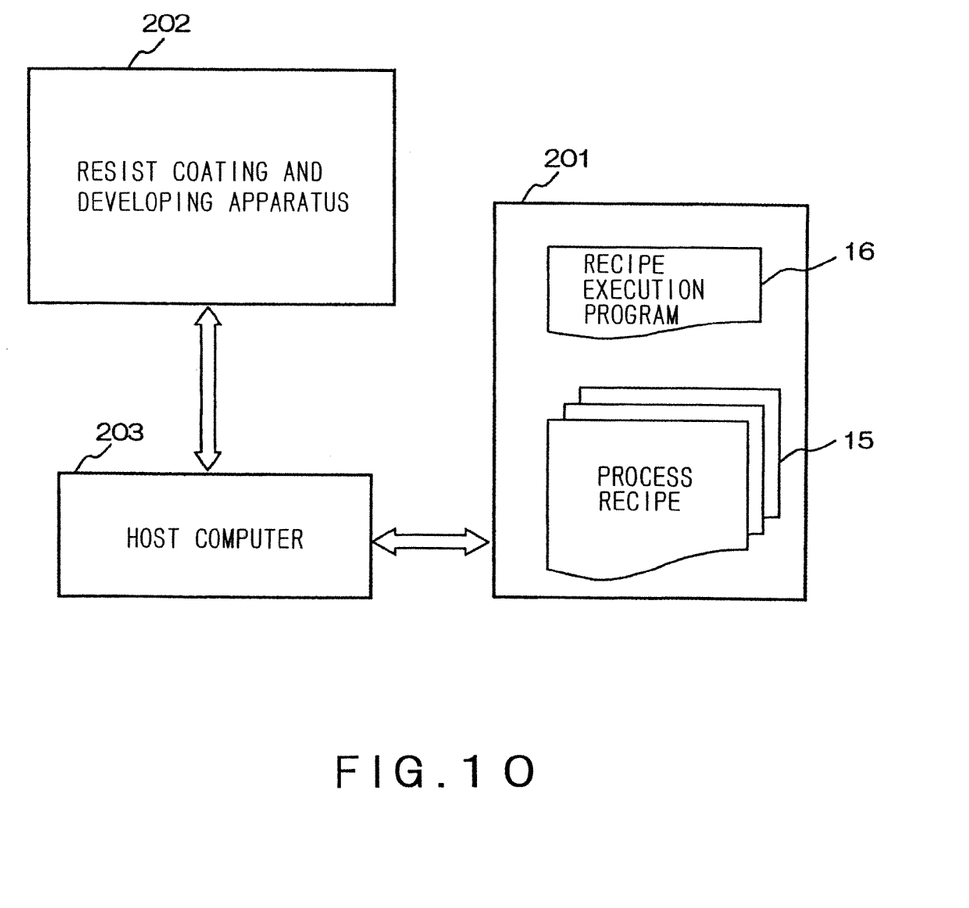
FIG. 10 is a block diagram showing the structure of a conventional system for operating a resist coating and developing apparatus according to a process recipe.
Figure 11:
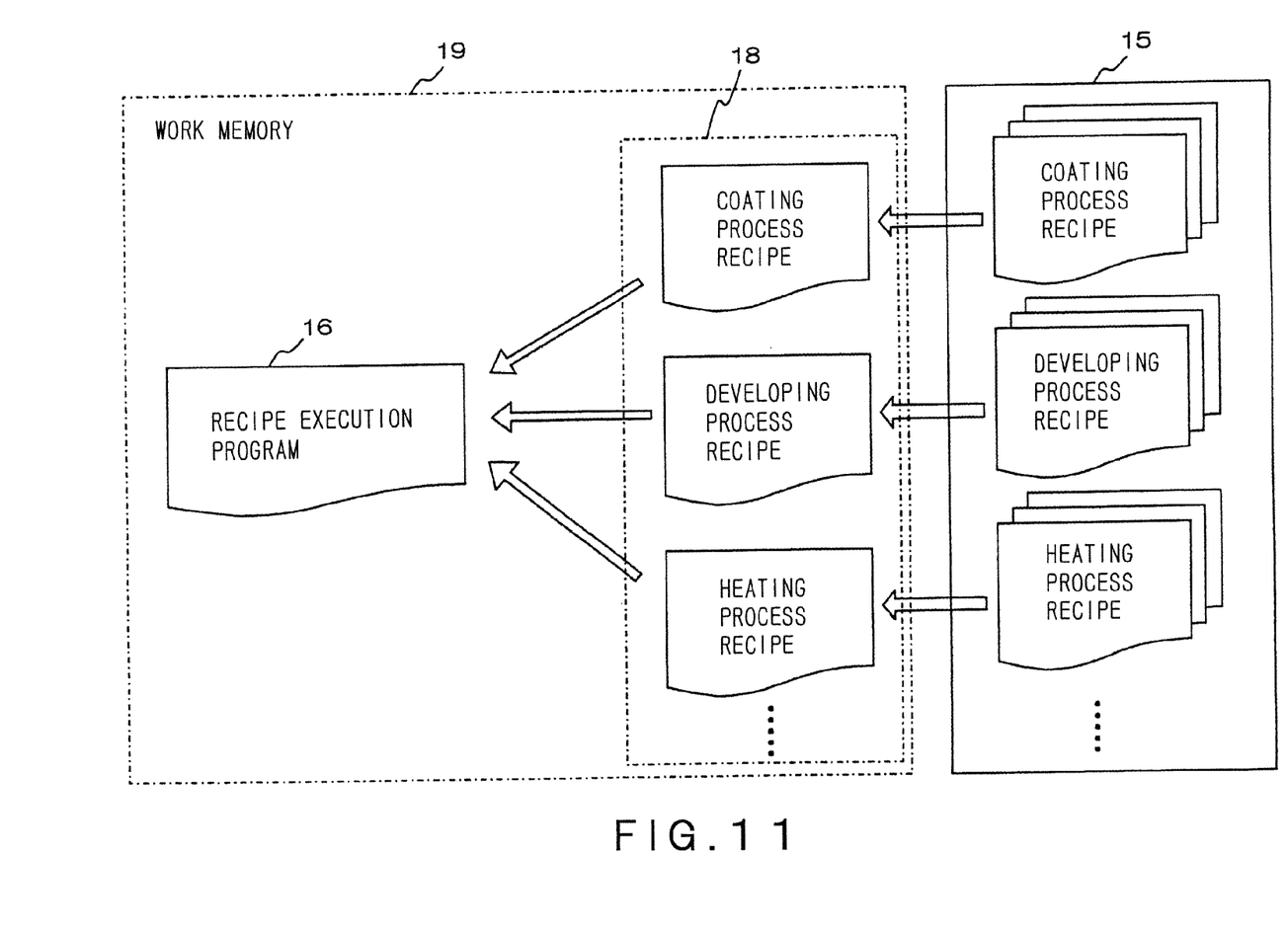
FIG. 11 is a conceptual diagram showing the manner in which process recipes selected out of a process recipe group are used by the recipe execution program.

Plural kinds of such process recipes are prepared for each process (resist coating process, developing process, etc.). As shown in FIG. 10, these process recipes are previously stored as a process recipe group (process recipe data group) 15 in storage means 201 such as a hard disc drive. When a resist coating and developing apparatus 202 operates, a desired process recipe is selected out of the process recipe group 15 by the operator, and a recipe execution program 16 is executed by a host computer 203 to operate the resist coating and developing apparatus 202 according to the selected process recipe. As shown in FIG. 11, upon execution of the recipe execution program 16, process recipes 18, which have been selected out of the process recipe group 15, are read out as execution recipes on a working memory 19 to be used in a program.

JP2001-345241A describes a substrate processing system that performs a photolithography according to a process recipe.

As shown in FIG. 11, the process recipe group 15 includes plural kinds of process recipes that are prepared for each kind of the processes. That is, a process recipe is selected out of the plurality of process recipes for each kind of the processes. Thus, the number of combinations of the process recipes capable of being executed in the overall photolithography process is enormous.

However, it is actually difficult to verify an operation of the recipe execution program 16 for all the vast number of combinations of the process recipes. Thus, a recipe execution program that was not fully verified is often used as a completed product temporarily.

When the substrate is subjected to a process of a combination of the process recipes for which an operation of the recipe execution program 16 is not verified, there may be a case in which a hardware does not work to conform to the recipes, because the program modules for respectively executing the successive process recipes cannot cooperate well with each other.

Even when such a failure occurs, it is often the case that the process continues while no attention is given to the failure, and a bug of the program is revealed from defective treatment of wafers after all the wafer-processing steps have been completed. Also in this case, it is significantly difficult to manually detect the bug of the program (debug operation), since there are too many processes in the program because of the complicated recipes. Accordingly, the debug operation of the recipe execution program 16 requires a long period of time, and thus the completeness of the program can not be improved in a short period of time.

DISCLOSURE OF THE INVENTION

The present invention has been made in view of the above circumstances, and the object of the present invention is to provide a technique that, when a malfunction of a hardware occurs due to a bug in a process recipe execution program for operating a substrate processing apparatus based on a process recipe, can reveal the bug of the program and removes the bug whereby the completeness of the program can be improved rapidly.

In order to achieve the above objective, according to a first aspect of the present invention, there is provided a substrate processing system comprising: a substrate processing apparatus that performs a process to a substrate; a computer adapted to control the substrate processing apparatus; and storage means that stores: a process recipe data defining specific operations of the substrate processing apparatus to be performed in the process; a recipe execution program, wherein upon execution of the recipe execution program, the computer issues instructions to the substrate processing apparatus to make the substrate processing apparatus to operate according to the process recipe data; a log output program, wherein upon execution of the log output program, the computer outputs a log data indicating the instructions sent from the computer to the substrate processing apparatus; and a comparing and checking program, wherein upon execution of the comparing and checking program, the computer compares the log data with the process recipe data corresponding to the log data.

In the above structure, when a disconformity between the log data and the process recipe data is found by the comparing and checking program, a position of a bug in the recipe execution program can be detected referring to the disconformity. Thus, a time period required for the debug operation can be reduced, to thereby smoothly improve a quality of the finished program.

In a preferred embodiment; the process may be divided into a plurality of steps, each including a part of the specific operations of the process; the recipe execution program may be configured so that, upon execution of the recipe execution program, the computer makes the substrate processing apparatus to perform the plurality of steps one by one; the log output program may be configured so that, upon execution of the log output program, the computer outputs the log data corresponding to each of the steps; and the comparing and checking program may be configured so that, upon execution of the comparing and checking program, the computer compares the log data of each of the steps and the process recipe data of the corresponding step.

By comparing and checking the log data with the process recipe data at each of the steps, where a bug is generated in the recipe execution program can be specified in more detail.

According to a second aspect of the present invention, there is provided a substrate processing method comprising the steps of: executing a recipe execution program by a computer, thereby making the computer to issue instructions generated based on a process recipe data to a substrate processing apparatus, wherein the process recipe data defines specific operations to be performed by the substrate processing apparatus; making the computer to output a log data indicating the instructions sent from the computer to the substrate processing apparatus; and making the computer to compare the log data with the process recipe data corresponding to the log data.

According to a third aspect of the present invention, there is provided a computer-readable storage medium storing a verification program for verifying a recipe execution program, wherein the verification program is configured so that, upon execution of the verification program, the computer performs the method comprising the steps of: outputting a log data indicating instructions sent from the computer to the substrate processing apparatus, wherein the instructions are generated based on a process recipe data defining specific operations to be performed by the substrate processing apparatus; and comparing the log data with the process recipe data corresponding to the log data.

BEST MODE FOR CARRYING OUT THE INVENTION

Figure 1:
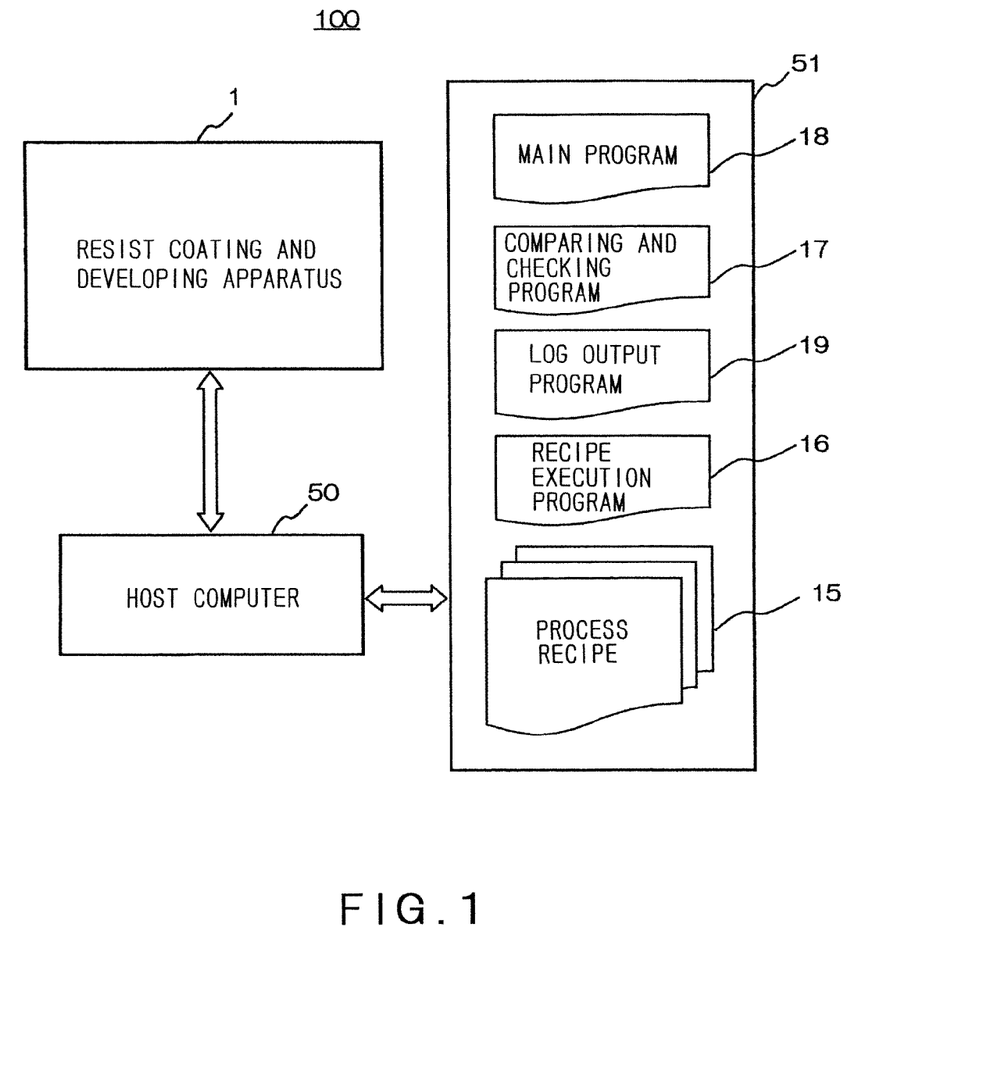
FIG. 1 is a block diagram of the overall structure of a substrate processing system according to the present invention.
Figure 2:
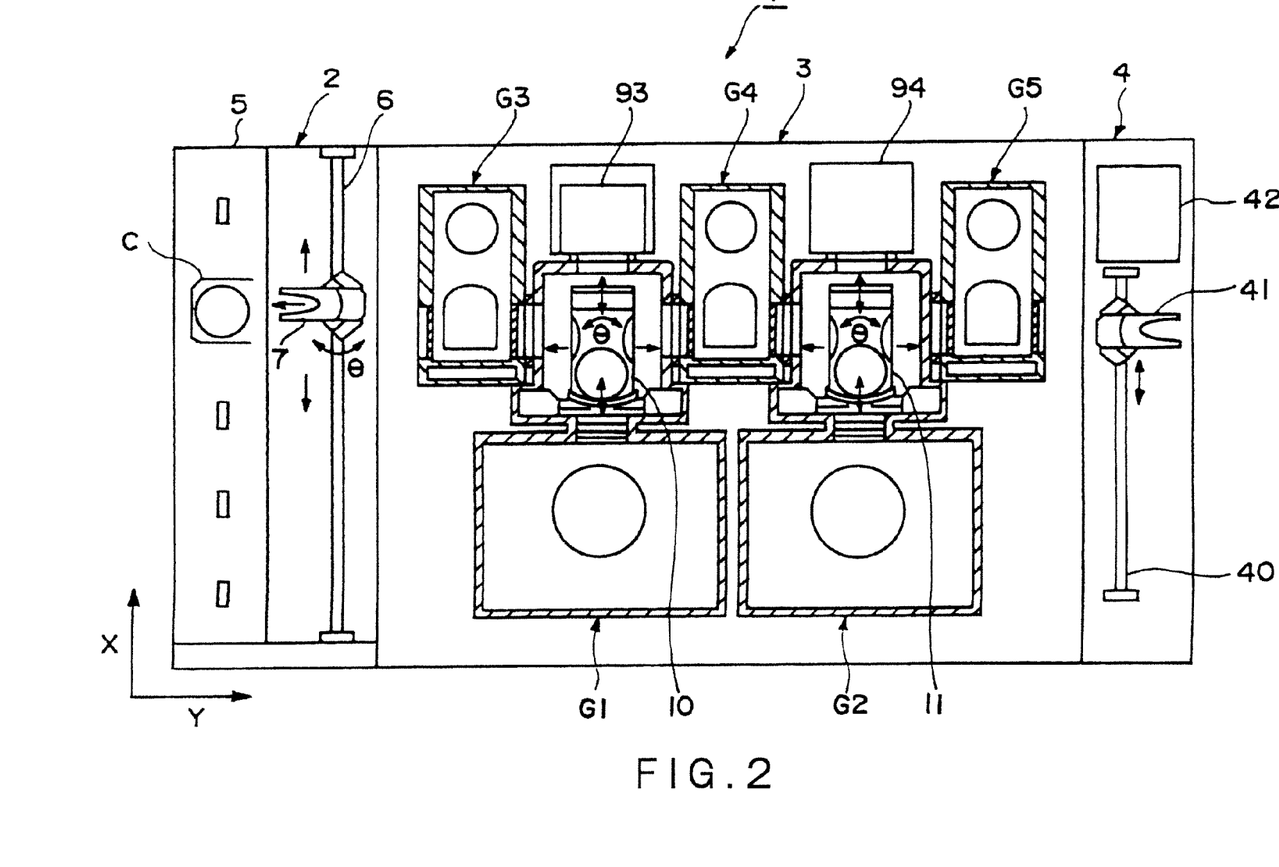
FIG. 2 is a plan view of the schematic structure of a resist coating and developing apparatus which is applied to the substrate processing system of FIG. 1.
Figure 3:
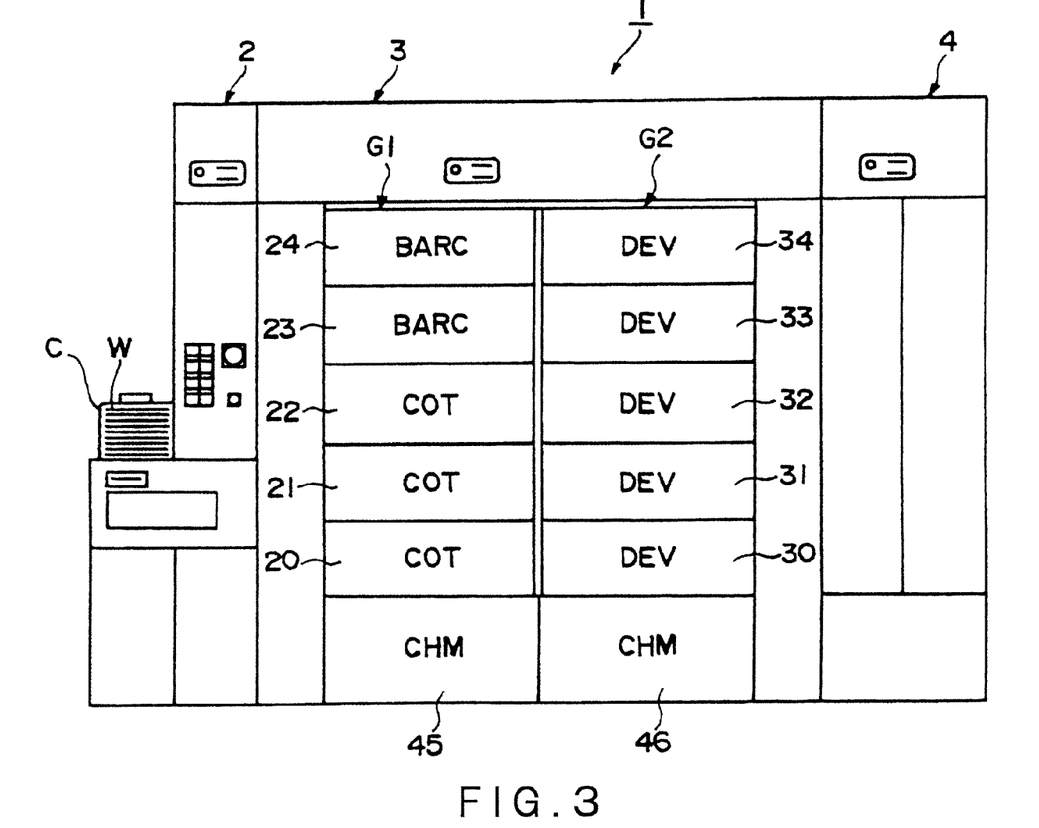
FIG. 3 is a front view of the resist coating and developing apparatus of FIG. 2.
Figure 4:
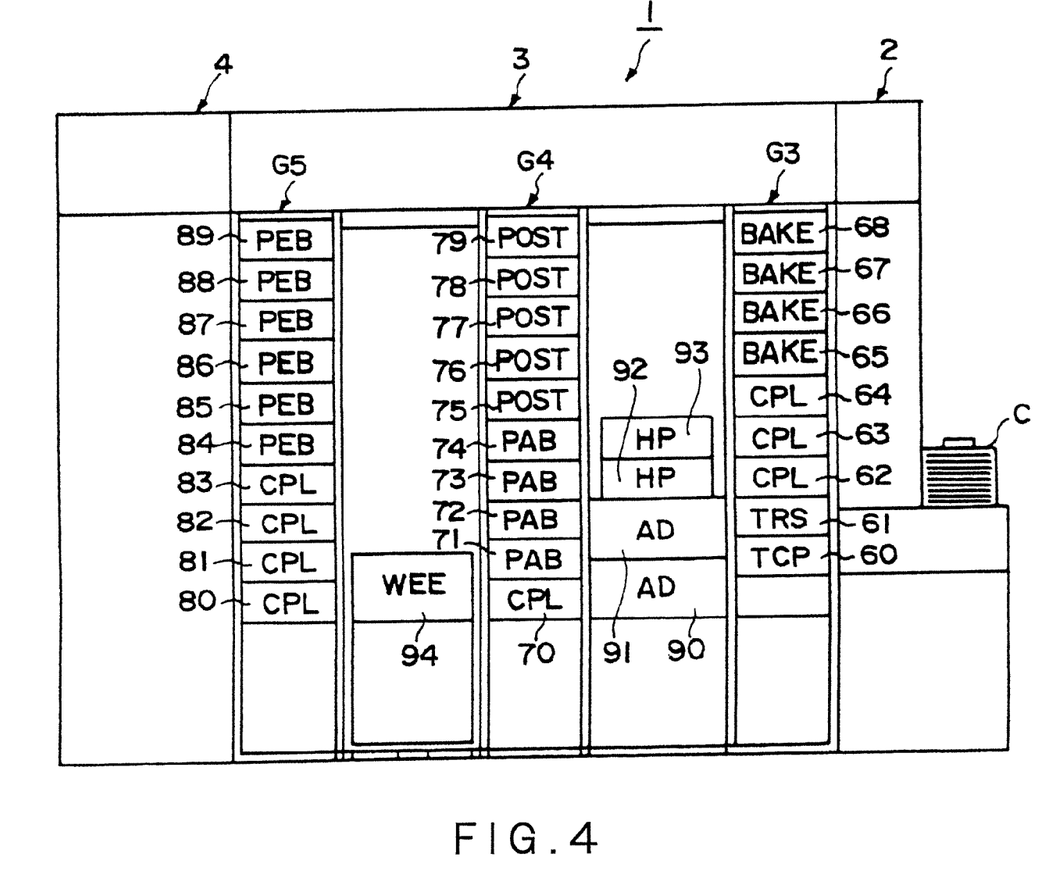
FIG. 4 is a rear view of the resist coating and developing apparatus of FIG. 2.

An embodiment of the present invention will be described below with reference to the accompanied drawings. FIG. 1 is a block diagram of the overall structure of a substrate processing system according to the present invention. FIG. 2 is a plan view of the schematic structure of a resist coating and developing apparatus (substrate processing apparatus) which is applied to the substrate processing system shown in FIG. 1. FIG. 3 is a front view of the resist coating and developing apparatus shown in FIG. 2. FIG. 4 is a rear view of the resist coating and developing apparatus shown in FIG. 2.

As shown in FIG. 1, the substrate processing system 100 includes: a resist coating and developing apparatus 1 that cooperates with an exposure apparatus, not shown, that performs a series of processes for a photolithography to a semiconductor wafer; a host computer 50 that controls operations of hardwares in the resist coating and developing apparatus 1; and storage means 51 such as a hard disc drive that stores process recipes, programs, and so on.

First, the structure of the resist coating and developing apparatus 1 is described. As shown in FIG. 2, the resist coating and developing apparatus 1 includes: a cassette station 2 at which, for example, twenty five wafers W in a cassette are received and delivered from and to the outside, and at which the wafers are loaded and unloaded into and from the cassette C; a process station 3 provided therein with a plurality of processing apparatuses stacked up at multiple levels each performing a predetermined single-wafer process of a photolithography processes; and an interface part 4 that transfers wafers W to and from the exposure apparatus disposed adjacent to the process station 3, which are integrally connected.

The cassette station 2 includes a cassette table 5 on which a plurality of cassettes C may be placed while being aligned in a row in X-direction (up and down direction in FIG. 1). The cassette station 2 is provided with a wafer transfer member 7 capable of moving along a transfer channel 6 in X-direction. The wafer transfer member 7 is also capable of moving in a wafer arraying direction (Z direction; vertical direction) of the wafers W contained in the cassette C, and thus is adapted to selectively access the wafers W in the cassettes arrayed in X-direction.

The wafer transfer member 7 is also rotatable in θ-direction about Z-axis, so that the wafer transfer member 7 can also access a temperature adjusting unit 60 and a transition unit 61 included in a third processing unit group G3 (described later) arranged in the process station 3.

The process station 3 adjacent to the cassette station 2 includes, for example, five processing unit groups G1 to G5 each provided with a plurality of processing units stacked up at multiple levels. In the process station 3, at a lower part of FIG. 2, the first processing unit group G1 and the second processing unit group G2 are arranged in that order from the cassette station 2 side. In an upper part of FIG. 2, the third processing unit group G3, the fourth processing unit group G4 and the fifth processing unit group G5 are arranged in that order from the cassette station 2 side.

A first conveyer 10 is disposed between the third processing unit group G3 and the fourth processing unit group G4. In order to transfer the wafer W, the first conveyer 10 is adapted to selectively access any one of the processing units in the first processing unit group G1, the third processing unit group G3 and the fourth processing unit group G4.

A second conveyer 11 is disposed between the forth processing unit group G4 and the fifth processing unit group G5. In order to transfer the wafer W, the second conveyer 11 is adapted to selectively access any one of the processing apparatuses in the second processing unit group G2, the forth processing unit group G4 and the fifth processing unit group G5.

The first processing unit group G1 shown in FIG. 2 includes liquid processing units each adapted to supply a predetermined liquid to the wafer W to process the same. For example, as shown in FIG. 3, there are stacked, at five levels, resist applying units (COT) 20, 21, and 22 for applying a resist liquid to the wafer W, and bottom coating unit (BARC) 23 and 24 for forming an antireflection film that prevents reflection of lights during an exposure process, in that order from below.

In the second processing unit group G2, there are stacked, at file levels, liquid processing units such as developing units (DEV) 30 to 34 for supplying a developing liquid to the wafer W to develop the same, in that order from below. At lowermost level of the respective first processing unit group G1 and second processing unit group G2, there are disposed chemical chambers (CHM) 45 and 46 for supplying various process liquids into the liquid processing units in the first and second processing unit groups G1 and G2.

As shown in FIG. 4, in the third processing unit group G3, there are stacked, at nine levels, a temperature adjusting unit (TCP) 60, a transition unit (TRS) 61 for transferring the wafers W, high-accuracy temperature adjusting units (CPL) 62 to 64 for adjusting the temperature of a wafer W under highly accurate temperature control, and high-temperature heat treatment units (BAKE) 65 to 68 for heating a wafer W at a high temperature, in that order from below.

In the fourth processing unit group G4, there are stacked, at ten levels, for example, a high-accuracy temperature adjusting unit (CPL) 70, pre-baking units (PAB) 71 to 74 for heat-treating a wafer W that has been subjected to the resist coating process, and post-baking units (POST) 75 to 79 for heat-treating a developed wafer W, in that order from below.

In the fifth processing unit group G5, there are stacked, at ten levels, a plurality of heat treatment units for heating the wafer W, such as high-accuracy temperature adjusting units (CPL) 80 to 83, and a plurality of post-exposure baking units (PEB) 84 to 89 for heating an exposed wafer W, in that order from below.

A plurality of processing units are disposed on the positive X-direction side of the first conveyer 10; for example, as shown in FIG. 4, there are stacked, at four levels, adhesion units (AD) 90 and 91 for performing hydrophobizing treatment to a wafer W, and heating units (HP) 92 and 93 for heating the wafer W, in that order from below. On the positive X-direction side of the second conveyer 11, there is disposed, for example, an edge exposure unit (WEE) 94 for selectively exposing only the edge portion of a wafer W.

As shown in FIG. 2, the interface part 4 is provided with a wafer transfer member 41 that moves along a transfer path 40 extending in X-direction, and a buffer cassette 42. The wafer transfer member 41 is movable in Z-direction and rotatable in θ-direction, and thus the wafer transfer member 41 is adapted to access the not-shown exposure apparatus adjacent to the interface part 4, the buffer cassette 42, and the fifth processing unit group G5, so as to transfer a wafer W.

Next, a series of process steps relating to photolithography performed by the resist coating and developing apparatus 1 as structured above will be described below. At first, in the cassette station 2, one wafer W is taken out from a cassette C holding therein unprocessed wafers W, and is transferred to the transition unit 61 in the third processing unit group G3 by the wafer transfer member 7. Thereat, the wafer W is subjected to alignment, and thereafter the wafer W is transferred to the adhesion unit (AD) 90, 91 in which the water W is subjected to a hydrophobizing treatment. Then, the wafer W is subjected to a predetermined cooling process in the high-accuracy temperature adjusting apparatus (CPL) 62-64. Following thereto, the wafer W is transferred to the resist coating unit (COT) 20-22 in the first processing unit group G1 in which a resist liquid is applied to the surface of the wafer W. Transport of the wafer W from the transition unit 61 to the resist coating unit 20-22 is carried out by the first conveyer 10.

Subsequently, the wafer W is transferred by the first conveyer 10 to the pre-baking unit 71-74 in the fourth processing unit group G4 in which the wafer W is subjected to a predetermined heat treatment, i.e., a pre-baking process. The pre-baked wafer W is then transferred to the edge exposure unit (WEE) 94 in which only the edge portion of the wafer is exposed.

Thereafter, the wafer W is cooled in the high-accuracy temperature adjusting unit (CPL) 80-83, and is transferred therefrom by the wafer transfer member 41 in the interface part 4 to the buffer cassette 42 to be temporarily stored therein. The wafer W thus temporarily stored is taken out from the buffer cassette 42 by the wafer transfer member 41, and is delivered to the not-shown exposure apparatus in which the wafer W is exposed.

The wafer W, having been subjected to the exposure process, is transferred through the interface part 4 to the post-exposure baking unit 84-89 in the fifth processing unit group G5 in which the wafer W is subjected to a post-exposure heat treatment. Thereafter, the wafer W is transferred by the second conveyer 11 to the developing unit 30-34 in the second processing unit group G2 in which the wafer W is developed. Then, the wafer W is transferred to the post-baking unit 75-79 in the fourth processing unit group G4 in which the wafer W is subjected to a post-development heat treatment. Then, the wafer W is subjected to a cooling treatment in the high-accuracy temperature adjusting unit 62-64 in the third processing unit group G3, and is returned to the cassette C by the wafer transfer member 7.

Next, the operation control of the resist coating and developing apparatus 1 by the host computer 5 will be described. As shown in FIG. 1, the storage means 51 stores: a process recipe group (process recipe data group) 15 which includes a number of process recipes (process recipe data) prepared for processes to be performed by the respective processing units such as the resist coating units 20 to 22 and the developing units 30 to 34; a recipe execution program 16 for executing the respective process recipes; and a log output program 19 that outputs the operation results of the recipe execution program 16 as a log data. Furthermore, the storage means 51 stores therein a comparing and checking program 17 that checks whether the resist coating and developing apparatus 1 works in conformity to the process recipes, and a main program 18 that controls execution of the respective programs 16, 17, and 19.

The operation of the main program 18 executed by the host computer 50 will be described with reference to the flowchart of FIG. 5. The following description is made to explain a case in which the resist coating unit 20-22 is operated by the recipe execution program 16, and the process recipe 200 shown in FIG. 9 is selected for the resist coating process. It goes without saying that, with processing units other than the resist coating units, the recipe execution program can be verified according to the method described below.

At first, the operator selects a process recipe corresponding to the process out of the process recipe group 15; the selected process recipe is set in the host computer 50; and then the main program 18 is executed by the host computer 50. Upon execution of the main program 18, the recipe execution program 16, the log output program 19, and the comparing and checking program 17 start running (step S1 in FIG. 5).

Figure 5:
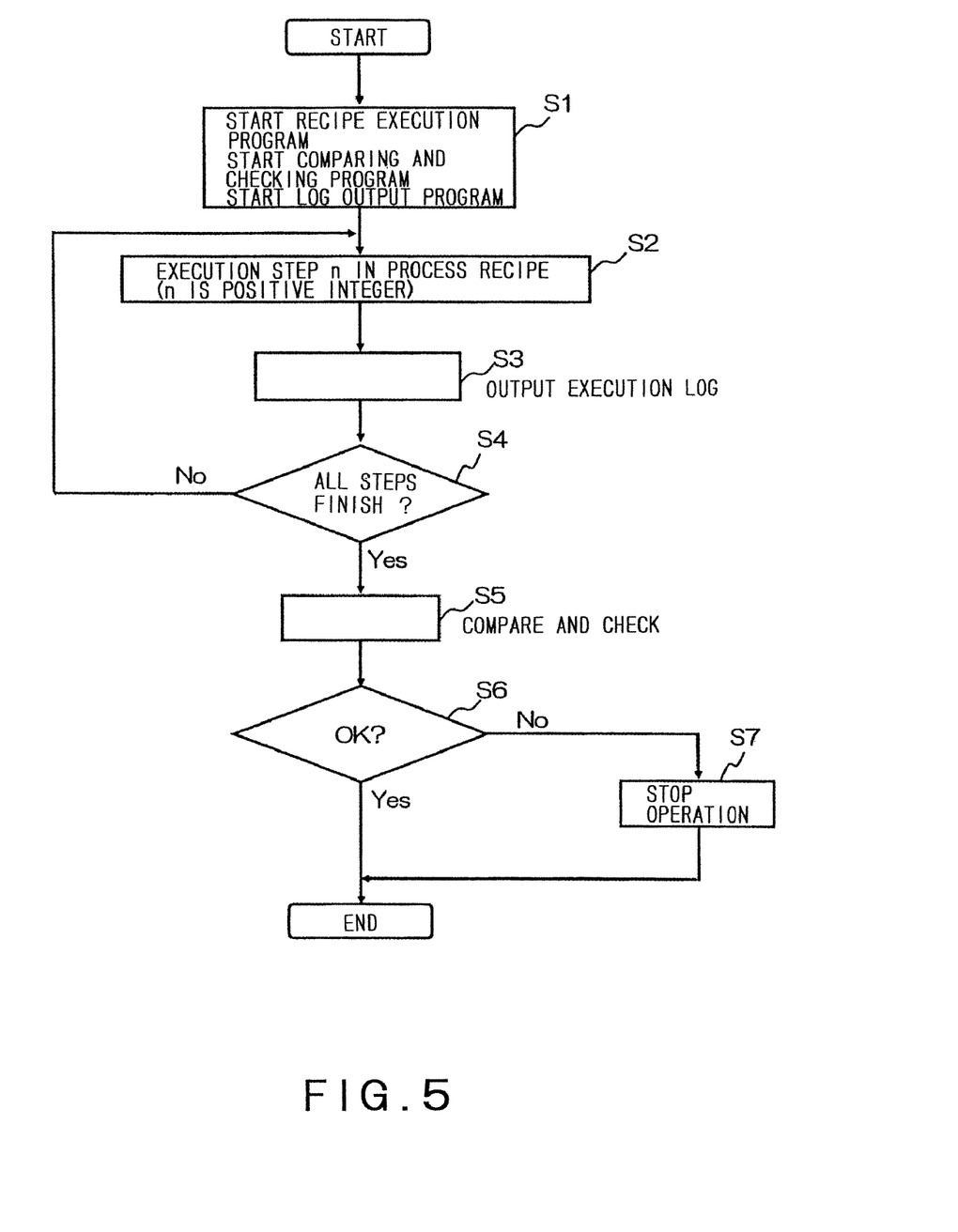
FIG. 5 is a flowchart of an operation of a main program executed in the substrate processing apparatus of FIG. 1.

Upon execution of the recipe execution program 16, process step n (n is a positive integer) in the resist coating process is performed by the resist coating and developing apparatus 1 according to the process recipe 200 (step S2 in FIG. 5). For example, in process step 1, the recipe execution program 16 issues operation instructions to the resist coating and developing apparatus 1 based on process conditions such as process period T1 (sec), rotational speed X1 (rpm) of the spinner, acceleration Y1 (rpm/s) of the spinner, "Begin" position of an arm 1, and moving speed Z1 (mm/s) of the arm 1.

Figure 6:
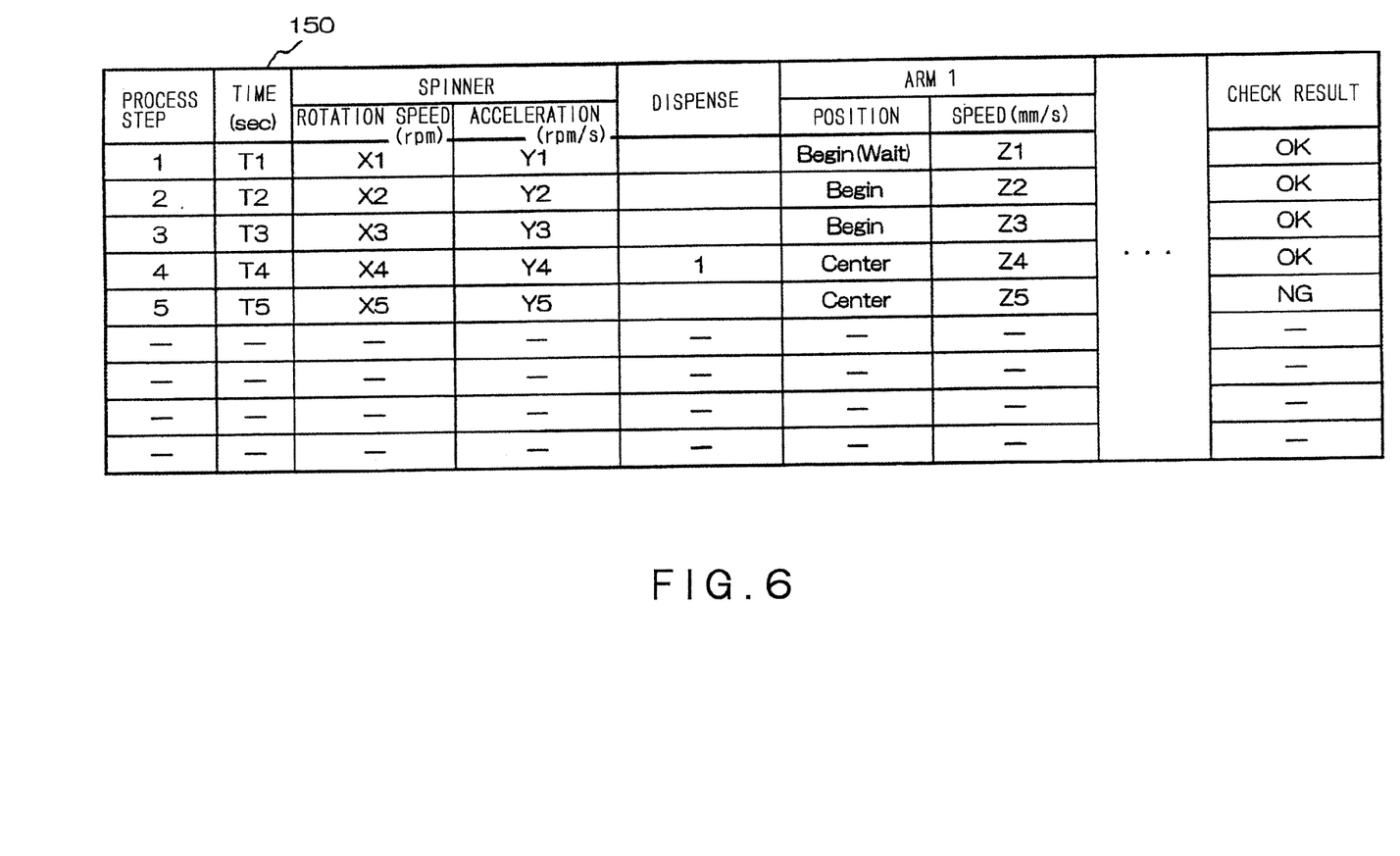
FIG. 6 is an example of an output of a log file by a log output program.

The log output program 19 writes in a log file 150 shown in FIG. 6 operation instructions, which are output in step n by the recipe execution program 16 to the resist coating and developing apparatus 1, (step S3 in FIG. 5). The log file 150 shown in FIG. 6 is a log file that stores the operation instructions issued by the recipe execution program 16 based on the process recipe 200. That is, as for the process step 1, for example, the log file 150 stores the process conditions such as the process period T1 (sec), the spinner rotational speed X1 (rpm), the spinner acceleration Y1 (rpm/s), the "Begin" position of the arm 1, and the moving speed Z1 (mm/s) of the arm 1, as the operation instructions issued by the recipe execution program 16.

When the log data at the process step n is written in the log file 150, it is judged whether all the steps are finished (step S4 in FIG. 5). When not all the process steps are finished, the next process step (n+1) is performed (step S2 in FIG. 5), and a log data as for the next step is written in the log file 150 (step S3 in FIG. 5). When all the process steps are finished, the log file 150 in which the log data for all the steps are written is verified by the comparing and checking program 17 (step S5 in FIG. 5).

The comparing and checking program 17 compares the log data written at process step n in the log file 150 with the process conditions defined for the process step n described in the process recipe 200, so as to check whether the recipe execution program 16 appropriately issues instructions in conformity to the process recipe 200. As shown in FIG. 6, results (OK, NG) checked by the comparing and checking program 17 for each of the process steps are written in the log file 150 by the log output program 19.

If there is no problem in the check results (step S6 in FIG. 5), the recipe execution program 16, the log output program 19, and the comparing and checking program 17 are terminated. On the other hand, at step S6, when any problem (NG) is found in the comparison and check result for the process step n (that is, the log data and the process content described in the process recipe are different from each other), the main program 18 stops the operation of the relevant unit in the resist coating and developing apparatus 1 (step S7 in FIG. 5).

Figure 7:
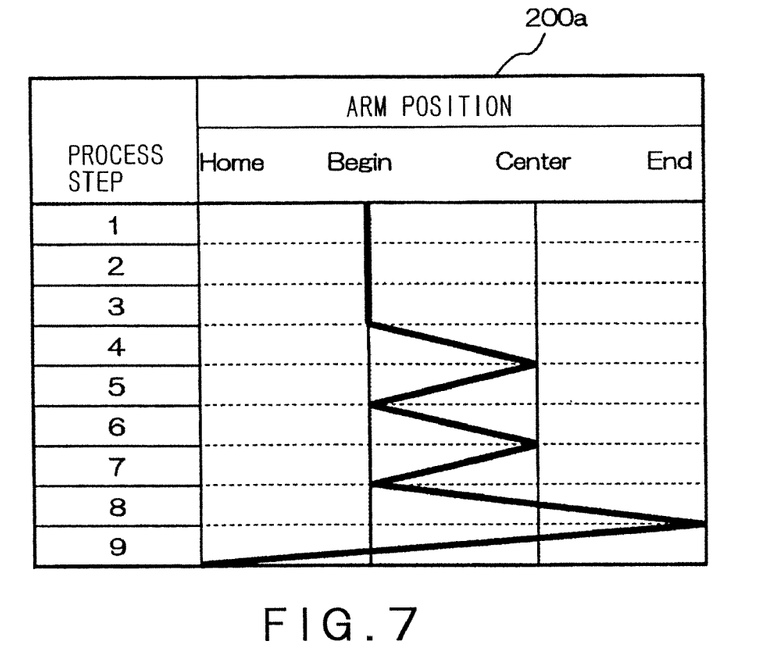
FIG. 7 is a line graph showing an example of positions of an arm to be moved according to a process recipe.
Figure 8:
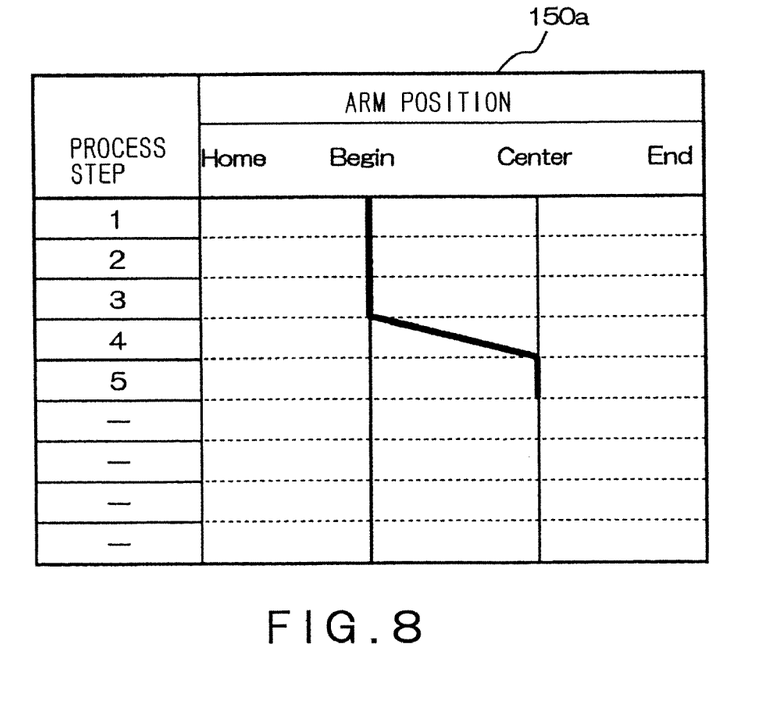
FIG. 8 is a line graph showing an example of positions of the arm which is moved according to operational instructions of a recipe execution program.

Description will be made, as an example where the check result is NG, about the operation of the arm 1 described in the process recipe 200. Positions where the arm 1 should be located in the series of steps according to the process recipe 200 can be shown by a line graph 200a of FIG. 7. However, if the instructions issued by the recipe execution program 16 and specifying the position of the arm 1 is "Center" as shown in the log file 150, step 6, of FIG. 6, positions to which the arm 1 actually moved from process step 1 to process step 5 are shown by a line graph 150a of FIG. 8.

That is, according to the process recipe 200, the arm 1 should be moved to the "Begin" position at the process step 5. However, the arm 1 is actually in the "Center" position at the process step 4 and the process step 5. In this case, since the process conditions described in the process recipe 200 differ from the log data written in the log file 150, the comparing and checking program 17 outputs check result NG, and the main program 18 executes a process (i.e., step 7 in FIG. 5) in response to the check result NG.

The log file output by the log output program 19 will not be deleted when the main program 18 is terminated, but is stored as a file data in the storage means 51 or a nonvolatile memory, not shown.

As described above, according to the main program 18, it is checked whether the operations performed in the resist coating and developing apparatus 1 conform to the process recipes in every process steps. If a check result is problematic, the operation of the relevant unit in the resist coating and developing apparatus 1 is stopped. Then, the check result denoting occurrence of a failure is stored in the log file, and the location of a bug in the recipe execution program 16 is specified.

In the flowchart shown in FIG. 5, the verification by the comparing and checking program 17 is executed after all the process steps are performed and the log data for the respective process steps are written in the log file 150 (that is, after all the process steps are completed), but is not limited to such a manner. For example, the log data writing operation to the verification operation by the comparing and checking program 17 may be performed as a series of operations at each process step, and the series of operations may be repeated until all the process steps are completed.

As has been described above, according to the embodiment of the present invention, the location of a bug of the recipe execution program 16 can readily be specified by writing in the log file a log data indicating instructions issued from the recipe execution program 16 to the resist coating and developing apparatus 1, and by comparing the log data and the process conditions described in the process recipe by the comparing and checking program 17. As a result, the time required for the debugging work can be reduced, and the completeness of the recipe execution program can be improved in a short time.

In the foregoing embodiment, the storage means 51 is a single storage medium such as a hard disc drive, but is not limited thereto, and may be composed of a plurality of hard disc drives or nonvolatile memories. In this case, the respective programs and the data of the process recipes may be stored in different storage mediums such as hard disc drives or nonvolatile memories. The type of the nonvolatile memory is not limited, and any type available in the computer technical filed may be used.

The log output program 19 and the comparing and checking program 17, as the verification programs for the recipe execution program 16, may be distributed (e.g., charged for the distribution) to a user of the substrate processing system, with those programs being stored in a storage medium such as a CD-ROM and a DVD-ROM, or through internet. If the program is distributed, the effect of the present invention may be provided by applying the foregoing verification programs to a substrate processing system of a conventional constitution.

In the above embodiment, a semiconductor wafer is taken as an example of a substrate to be processed. However, not limited to the semiconductor wafer, the substrate in the present invention may be an LCD substrate, a CD substrate, a glass substrate, a photo mask, and a printed substrate.

The present invention is applicable to a substrate processing system for processing a substrate such as a semiconductor wafer that includes a resist pattern forming apparatus, and can be suitably used in a semiconductor manufacturing field, an electronic device manufacturing field, and the like.

The invention claimed is:

1. A substrate processing system, comprising:
a substrate processing apparatus that performs a process to a substrate;
a computer that controls the substrate processing apparatus; and
storage means encoded with:
a process recipe data defining specific operations of the substrate processing apparatus to be performed in the process;

a recipe execution program, wherein execution of the recipe execution program causes the computer to issue instructions to the substrate processing apparatus to control the substrate processing apparatus to operate according to the process recipe data;

a log output program, wherein execution of the log output program causes the computer to output a log data indicating the instructions sent from the computer to the substrate processing apparatus; and a comparing and checking program, wherein execution of the comparing and checking program causes the computer to compare the log data with the process recipe data corresponding to the log data, the log data corresponding to the instructions generated by the recipe execution program based on the process recipe data when the substrate processing apparatus is actually operated to perform the specific operation defined by the process recipe.

2. The substrate processing system according to claim 1, wherein:

the process is divided into a plurality of steps, each including a part of the specific operations of the process;

the execution of the recipe execution program causes the computer to control the substrate processing apparatus to perform the plurality of steps one by one;

the execution of the log output program causes the computer to output the log data corresponding to each of the steps; and the execution of the comparing and checking program causes the computer to compare the log data of each of the steps and the process recipe data of the corresponding step.

3. A substrate processing method, comprising the steps of:

executing a recipe execution program by a computer, thereby making the computer issue instructions, the instructions generated based on a process recipe data, to a substrate processing apparatus, the process recipe data defining specific operations to be performed by the substrate processing apparatus, and operating the substrate processing apparatus according to the instructions;

making the computer output a log data indicating the instructions sent from the computer to the substrate processing apparatus; and making the computer compare the log data with the process recipe data corresponding to the log data, the log data corresponding to the instructions generated by the recipe execution program based on the process recipe data when the substrate processing apparatus is actually operated to perform the specific operation defined by the process recipe.

4. A computer-readable storage medium storing a verification program for verifying a recipe execution program stored in a computer for controlling operation of a substrate processing apparatus, wherein execution of the verification program causes the computer to perform a method comprising the steps of:

executing the recipe execution program to issue instructions, the instructions being generated based on a process recipe data, to the substrate processing apparatus, the process recipe data defining specific operations to be performed by the substrate processing apparatus, thereby operating the substrate processing apparatus according to the instructions;

outputting a log data indicating instructions sent from the computer to the substrate processing apparatus; and comparing the log data with the process recipe data corresponding to the log data, the log data corresponding to the instructions generated by the recipe execution program based on the process recipe data when the substrate processing apparatus is operated to perform the specific operation defined by the process recipe.

* * * * *